United States Patent [19]
Jewell

[11] Patent Number: 5,397,473
[45] Date of Patent: Mar. 14, 1995

US005397473A

[54] BIOLOGICAL TREATMENT METHOD FOR WATER

[75] Inventor: William J. Jewell, Ithaca, N.Y.

[73] Assignee: Cornell Research Foundation, Inc., Ithaca, N.Y.

[21] Appl. No.: 113,426

[22] Filed: Aug. 27, 1993

[51] Int. Cl.$^6$ ............................................. C02F 3/02
[52] U.S. Cl. ..................... 210/610; 210/615; 210/620; 210/903; 210/906
[58] Field of Search ............ 210/610, 611, 615, 617, 210/620, 631, 906, 903

[56] References Cited

U.S. PATENT DOCUMENTS

| | | | |
|---|---|---|---|
| 3,423,309 | 1/1969 | Albertson | 210/906 |
| 3,591,491 | 7/1971 | Smith et al. | 210/625 |
| 4,173,531 | 11/1979 | Matsch et al. | 210/903 |
| 4,183,808 | 1/1980 | Drnevich | 210/906 |
| 4,370,234 | 1/1983 | Marsland | 210/903 |
| 4,576,717 | 3/1986 | Collin et al. | 210/610 |
| 4,713,343 | 12/1987 | Wilson et al. | 210/611 |
| 4,721,585 | 1/1988 | Santolini et al. | 210/616 |
| 4,756,831 | 7/1988 | Menzel et al. | 210/903 |
| 4,826,607 | 5/1989 | Spratt et al. | 210/906 |
| 4,877,736 | 10/1989 | Fliermans | 435/262 |
| 4,925,802 | 5/1990 | Nelson et al. | 438/262 |
| 4,954,258 | 9/1990 | Little | 210/611 |
| 4,959,315 | 9/1990 | Nelson et al. | 435/262 |
| 5,024,949 | 6/1991 | Hegeman et al. | 435/262 |
| 5,037,551 | 8/1991 | Barkley et al. | 210/610 |
| 5,055,193 | 10/1991 | Hooper | 435/262 |
| 5,057,221 | 10/1991 | Bryant et al. | 210/610 |
| 5,071,755 | 12/1991 | Nelson et al. | 435/262 |
| 5,079,166 | 1/1992 | Winter et al. | 435/262 |
| 5,114,586 | 5/1992 | Humphrey | 210/620 |
| 5,124,039 | 6/1992 | Brautigam | 210/903 |
| 5,182,021 | 1/1993 | Spector | 210/906 |
| 5,286,385 | 2/1994 | Jorgensen et al. | 210/610 |

FOREIGN PATENT DOCUMENTS 3121395 12/1982 Germany .
49-98056 9/1974 Japan .

*Primary Examiner*—Christopher Upton
*Attorney, Agent, or Firm*—Nixon, Hargrave, Devans & Doyle

[57] ABSTRACT

A biological treatment method for water containing nitrogen and phosphorus is provided. Treatment is carried out by contacting the water with one or more substituted or unsubstituted hydrocarbon compounds each having from 1 to 6 carbon atoms in the presence of methanotrophs and/or aerobic heterotrophic bacteria under process conditions effective to reduce soluble nitrogen and soluble phosphorus levels in the water each to below about 1 mg/L.

21 Claims, 8 Drawing Sheets

BIOLOGICAL TREATMENT METHOD FOR WATER

FIELD OF THE INVENTION

This invention relates to a biological method for treating water. More specifically, this invention relates to a method for removing nutrients, particularly nitrogen and phosphorus, from wastewater using methane oxidizing bacteria.

BACKGROUND OF THE INVENTION

Sewage effluent is typically treated in several stages. Larger suspended solids are removed in the first stage. Secondary sewage treatment, which typically involves microbial degradation that mineralizes compounds containing nutrients, thus making them soluble, and other unit processes, removes suspended solids, decreases oxygen demand and disinfects sewage effluent. Secondary sewage treatment generally does not remove nutrients such as nitrogen and phosphorus.

The treatment of secondary sewage containing nutrients with a tertiary process is being mandated in many areas. The presence of nitrogen and phosphorus in secondary sewage can be significantly detrimental, leading to increased chlorine demand, conversion of ammonia into nitrates, and stimulation of algae resulting in low dissolved oxygen concentrations and eutrophication of receiving waters.

The usefulness of prior nutrient removal processes is limited. Each process typically removes only one form of one element. For example, only oxidized forms of nitrogen are removed by denitrification. Ammonia can be stripped by aeration, but only if the wastewater pH is carefully controlled. In addition, many processes result in the need for further treatment. An additional step is required for denitrification of sewage having oxidized forms of nitrogen by methanol addition, for example, and the use of metals to precipitate phosphorus requires an additional pH control step.

There are various biological sewage treatment methods. Biological treatment methods employ microorganisms to degrade pollutants. U.S. Pat. Nos. 5,057,221 to Bryant, et al; 4,877,736 to Flierman; and 4,713,343 to Wilson, et al. describe the use of heterotrophic and methylotrophic organisms, including methanotrophs, to dehalogenate and degrade halogenated organic compounds in wastewater. U.S. Pat. No. 4,954,258 to Little similarly describes the methanotrophic degradation of halogenated aliphatic hydrocarbons, using an alkanol rather than an alkane as a carbon source for the organisms.

U.S. Pat. Nos. 4,959,315 and 5,071,755 to Nelson, et al. also describe the biodegradation of halogenated aliphatic compounds, and specifically describe the use of aromatic compounds such as substituted benzenes to induce degradation. In U.S. Pat. No. 4,925,802 to Nelson et al., the biodegrading activity of selected microorganisms is induced using nontoxic, nongaseous substances such as aromatic amino acids.

Other biological methods for degrading halogenated organic compounds employ various other specific organisms and food sources. For example, the method described in U.S. Pat. No. 5,024,949 to Hegeman, et al. uses certain Pseudomonas bacteria to degrade trichloroethylene. The bacteria employed by Hegeman is capable of sustained growth solely on a hydrocarbon mixture containing a branched chain alkyl-substituted aromatic hydrocarbon. Genetically engineered microorganisms have also been used to degrade trichloroethylene, as described in U.S. Pat. No. 5,079,166 to Winter, et al. A method for degrading halogenated hydrocarbons utilizing an ammonia-oxidizing bacterium is described in U.S. Pat. No. 5,055,193 to Hooper.

A combination of chemical and biological methods for reducing B.O.D., T.S.S., coliform bacteria, nitrogen and phosphorus to acceptable levels is described in U.S. Pat. No. 4,826,601 to Spratt, et al. A series of treatment steps and cells are employed. Phosphorus is removed by adding alum to combine with soluble phosphate. Nitrogen is removed in a two-step process. Ammonia is oxidized to form nitrates, which are subsequently removed by aerobic bacteria. Spratt is representative of many of the disadvantages of prior nutrient removal processes, in that separate processes are employed to remove nitrogen and phosphorus, and nitrogen removal requires separate oxidation and biological steps.

U.S. Pat. No. 4,721,585 to Santolini, et al., discloses a biological sewage purification method aimed at reducing the nitrogen and phosphorus content of wastewater. In Santolini, raw cellulosic matter is added to fouled water under aerobic conditions, in connection with either secondary or tertiary treatment, to assimilate nitrogen and phosphorus. No quantification of the reduction in nitrogen or phosphorus levels by Santolini is disclosed, however. Also, even under the most favorable conditions disclosed in Santolini, less than ten percent (10%) of the nutrients in sewage would be removed if cellulose were added in the proportions disclosed.

There are several other problems associated with the treatment of wastewater using cellulose devouring bacteria. The addition of cellulose to sewage as described in Santolini would dramatically increase the amount of sludge produced in the treatment process. Already, with conventional treatment systems, approximately one-half ton of dry sludge is produced for every million gallons of domestic sewage produced (or per 10,000 people). Use of a biodegradable waste cellulose source would increase the total dry tonnage of sludge to greater than three (3) tons per million gallons, and would, therefore, be prohibitively expensive.

In addition, the use of solid waste as a cellulose source, as described in Santolini, would, in some respects, pollute the water being treated by introducing or increasing the concentration of toxic substances carried by the refuse. Other sources of cellulose, such as straw or corn stalks, or wood scraps or shavings, would themselves add nutrients to the system as they decomposed.

The present invention is directed to a nutrient removal method which overcomes the problems associated with prior water treatment methods.

SUMMARY OF THE INVENTION

The present invention relates to a biological treatment process for water containing nitrogen and phosphorus. Water containing these nutrients is contacted with at least one carbon source, such as a substituted or unsubstituted low molecular weight hydrocarbon, in the presence of one or more species of methanotrophs or aerobic heterotrophic bacteria. Process conditions employed are those effective to reduce soluble nitrogen levels in the water to below 1 mg/L, and soluble phosphorus levels to below 1 mg/L, although reductions in nitrogen and phosphorus concentrations to below 0.1 mg each/liter may be achieved with the method of the invention.

Treatment is preferably carried out in water having a nitrogen to phosphorus ratio of from about 15:1 to about 4:1 by mass of nitrogen and phosphorus, which ratio is most preferably from about 12:1 to about 8:1, in the presence of methane-utilizing bacteria known as methanotrophs. Although methanotrophs can utilize other carbon sources such as methanol and other low molecular weight hydrocarbons, methane is the preferred carbon source for water treatment in accordance with the method of the invention. The temperature of the water being treated can range from about 1° C. to about 43° C. Treatment is most effective with water temperatures of from about 20° C. to about 39° C.

The method of the present invention has numerous advantages over prior nutrient removal processes. With the method of the invention, nitrogen and phosphorus are simultaneously removed in the same process. No prior treatment of raw sewage is necessary, although simple screening may be useful to remove large particles. The method is also significantly less complex than prior nutrient removal processes, and can be used in place of all of the nutrient removal processes commonly employed in present sewage treatment systems. Treatment of wastewater in accordance with the method of the invention can eliminate the need for digestion and de-watering processes, in situations where the solids are recovered for beneficial uses. Furthermore, it is not necessary to separate the primary sludge from the wastewater at the front-end of conventional sewage treatment systems which have been adapted to the method of the invention, because the stabilization of primary sludge requires a relatively insignificant amount of oxygen, as compared with the oxygen required to grow methanotrophs in accordance with the invention.

As described above, nutrient levels in wastewater may be reduced to exceptionally low levels. Therefore, in one aspect of the invention, wastewater which has been pretreated to remove, for example, 50-60% of the nutrients with other nutrient removal processes, such as lime precipitation of phosphorus, denitrification, ammonia stripping, biological phosphorus removal, ion-exchange treatment, and chemical manipulations of nitrogen and phosphorus, may be treated with the method of the invention to reduce nitrogen and phosphorus concentrations each to below 0.1 mg/L. It is possible, using the method of the invention, to reduce soluble phosphorus and nitrogen levels to below common limits of detection, or below about 0.03 mg/L.

In addition, the volume of sludge produced by the method of the invention is significantly less than the amount produced using cellulose-devouring bacteria, as described above. The present method also achieves far superior nutrient assimilation than methods employing bacteria grown on cellulose, and does not involve the addition of nutrients or the potential for the addition of pollutants associated with the particular nutrient removal method described in Santolini.

The nature of the by-products produced in the method of the invention is another advantage. Conventional sewage treatment processes typically produce sludge by-products having a low value as fertilizer (about $5/ton at current nitrogen prices), which must be wasted. The by-products of the present method include significant quantities of bacteria containing well-balanced protein for animal feed. Methanotrophs, in particular, have a better amino acid balance than most other single-cell protein sources. The protein synthesized by methanotrophs is, therefore, directly useful as an animal food. When dried in their fresh form, methanotrophs have a pleasant odor similar to some high-protein animal foods, such as alfalfa.

Finally, the method of the invention does not suffer from the problems typically associated with the recovery of bacteria. Huge technical and capital investments are usually required to recover bacteria in a dried, storable, useful form. Bacteria produced in a rapidly growing microbial system are very small and often difficult to separate from water, especially when high aeration rates are employed, as in one embodiment of the present method. Although the bacteria produced in accordance with the present invention grow rapidly, they form highly coagulated, easily separated microbial flocks, which can be centrifuged and dried relatively inexpensively for use as an animal feed.

DETAILED DESCRIPTION OF THE DRAWINGS AND THE INVENTION

Figure 1:
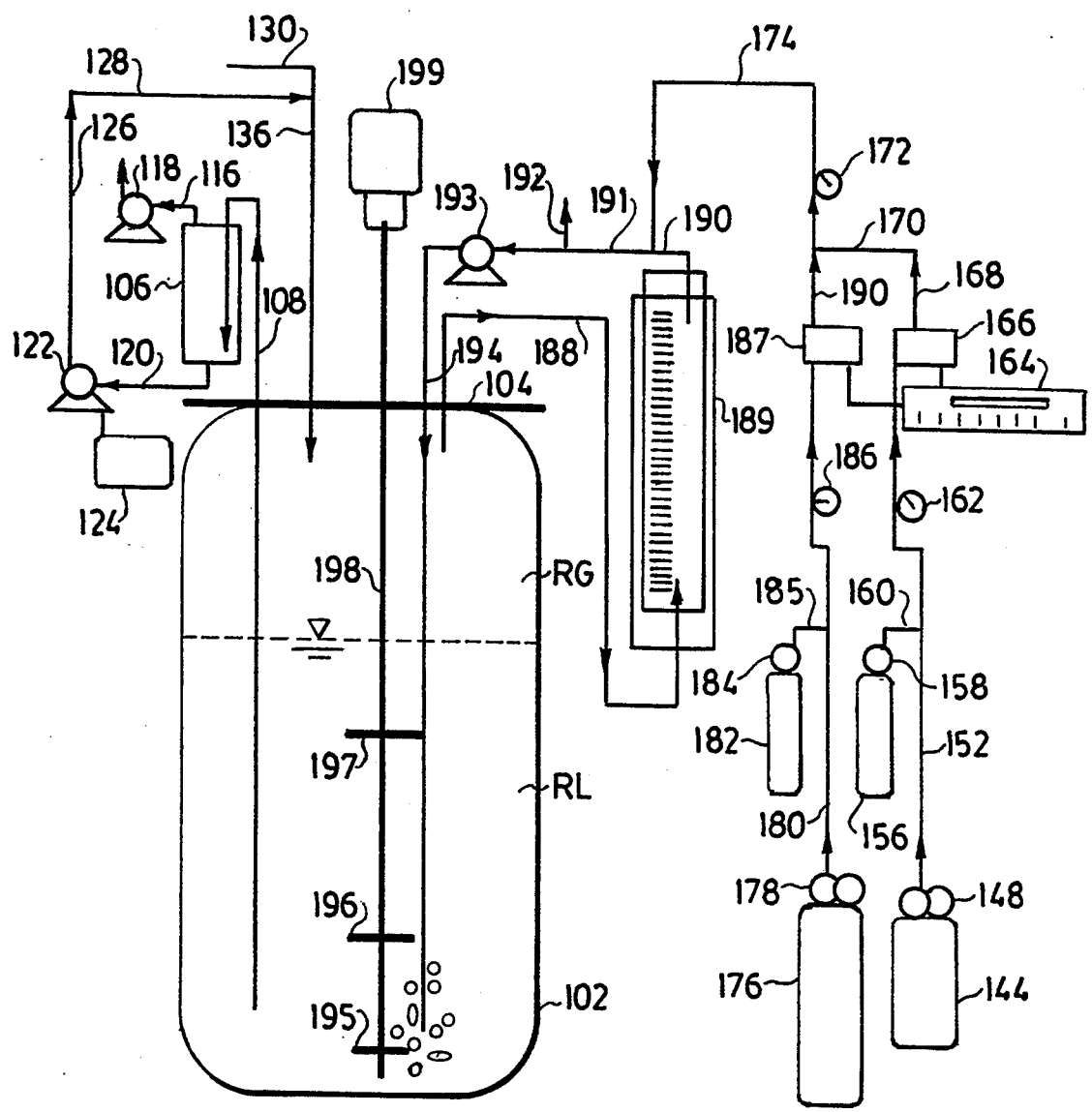
FIG. 1 is a schematic view of a laboratory scale nutrient removal reactor.

FIG. 1 is a schematic view of a laboratory scale nutrient removal reactor which is useful for carrying out one embodiment of the method of the invention. Influent water to be treated is introduced through influent line 130 and line 136 into fermentation tank 102, which is covered with headplate 104. Reactor liquid RL is agitated by impellers 195, 196, and 197 mounted on impeller shaft 198, which is turned by motor 199.

As is further illustrated in FIG. 1, oxygen and methane feed gases are supplied to reactor liquid RL either from high pressure oxygen and methane storage tanks 176 and 144, respectively, fitted with pressure regulators 178 and 148, through gas lines 180 and 152, or from low pressure oxygen and methane supply tanks 182 and 156, respectively, fitted with pressure regulators 184 and 158, through gas supply lines 185 and 160. Gas supply lines 185 and 160 supply gas lines 180 and 152. Gas flow is controlled with regulators 186 and 162, alone or in conjunction with mass flow controller 164, and secondary flow measuring devices 187 and 166. Methane is supplied through methane supply lines 168 and 170 and mixed with oxygen in oxygen supply line 190. Mixed gas regulator 172 controls mixed gas flow through line 174.

Reactor gas RG over reactor liquid RL in fermentation tank 102 is vented from tank 102 via gas line 188 into gas reservoir 189. Gas from gas reservoir 189 exits through reservoir line 190 and combines in tank supply line 191 with the methane-oxygen mixture supplied through line 174. Tank supply gas in supply line 191, which can be drawn off for sampling through gas sample port 192, is pumped by gas recycle pump 193 into tank 102 through tank supply line 194.

As shown in FIG. 1, reactor liquid RL is continuously or intermittently removed from tank 102 and conveyed through liquid line 108 into cell recycle tube 106. Tank effluent is continuously pumped from the top of recycle tube 106 by pump 118 through effluent line 116 to an effluent container (not shown). Solids are pumped by pump 122 from the bottom of cell recycle tube 106 through lines 120, 126, and 128 back into fermentation tank 102 through line 136. Pump 122 is optionally fitted with timer 124 to automatically control intermittent solids recycle.

Figure 2:
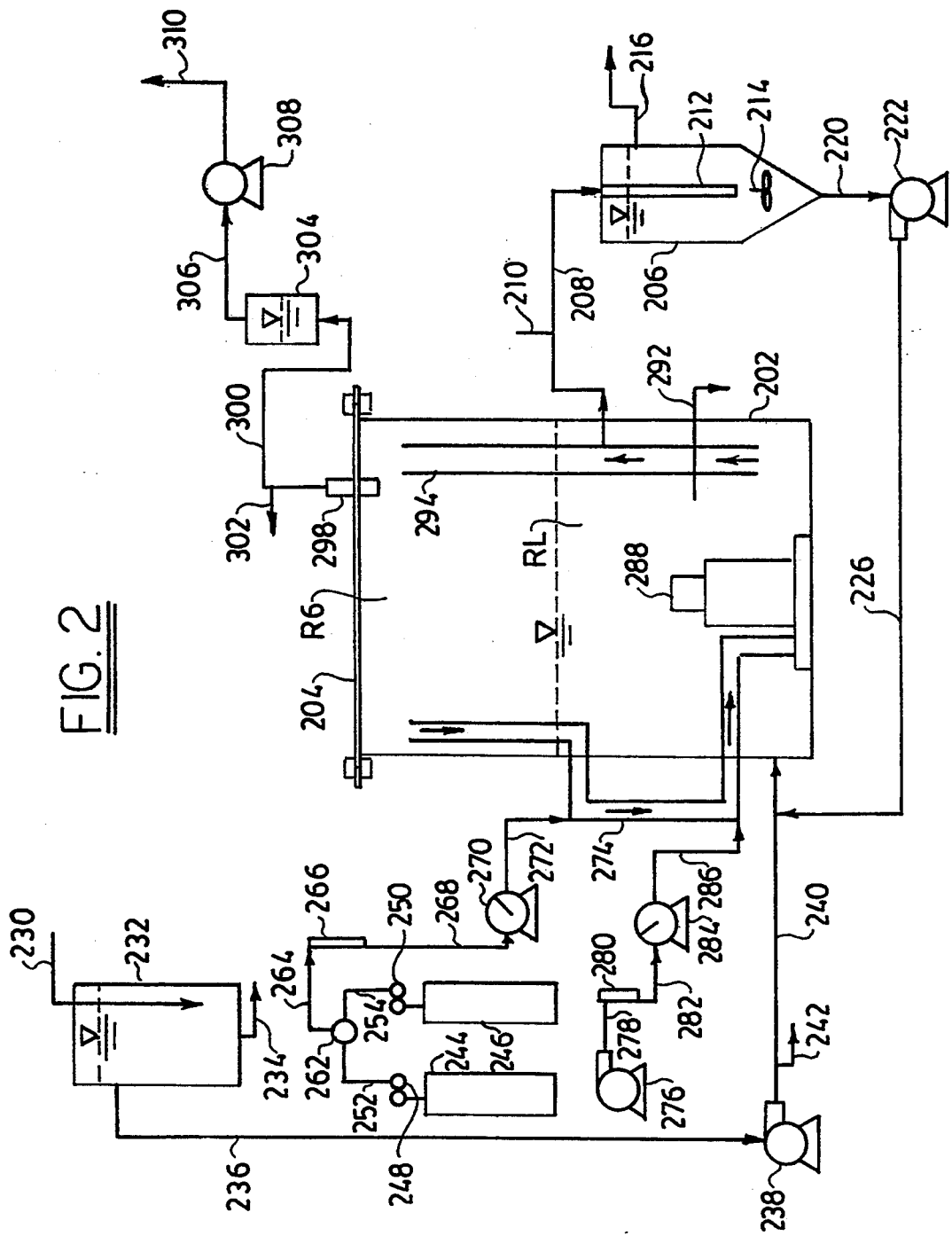
FIG. 2 is a schematic view of a pilot scale nutrient removal reactor.

FIG. 2 is a schematic of a pilot scale nutrient removal reactor. In operation, raw sewage is supplied to the nutrient removal system via sewage inlet 230. As illustrated in FIG. 2, grit and large particles are removed from raw sewage in drum 232, the bottom of which is equipped with grit cleanout outlet 234. Influent to be treated by the method of the invention is pumped by pump 238 through influent lines 236 and 240 from an overflow port (not shown) in drum 232 into reactor tank 202, which is capped by cover 204. Influent may be drawn off for pretreatment sampling via port 242.

Also as shown in FIG. 2, methane is supplied to reactor tank 202 from cylinders 244 and 246, fitted with pressure regulators 248 and 250. The supply of methane to reactor tank 202 through gas lines 264, 268, 272 and 274 is further controlled by main methane valve 262 and gas rotameter 266. Wet test meter 270 measures methane flow. Methane is directly supplied to reactor tank 202 via aspirator tube 274.

As is further illustrated in FIG. 2, compressor 276 supplies air to reactor tank 202 via air lines 278, 282 and 286. Air flow is controlled by rotameter 280 and measured by wet test gas meter 284. As shown in FIG. 2 and as described above in connection with the methane supply, air is introduced into reactor tank 202 via aspirator tube 274.

Aspirator tube 274 functions as the gas supply line, as described above, and the gas recycle line. Headgasses over reactor liquid RL in reactor tank 202 are recycled through and mixed with fresh methane and air in aspirator tube 274. The mixture of methane, air and recycled reactor headgasses are brought into contact with reactor liquid RL via aerator 288.

Exhaust gas is vented from the reactor through pipe 298 and travels through line 300 into water-filled reservoir 304, which functions to prevent the backflow of atmospheric gas. Wet test gas meter 308 measures the flow of exhaust gas from the system to an outside vent (not shown) through vent line 310. Exhaust gas can be drawn from line 300 through port 302 for sampling.

Reactor tank 202 is fitted with sample port 292, through which reactor liquid may be drawn for analysis. Effluent from the reactor is removed from internal settling column 294 and exits reactor tank 202 via exit line 208, fitted with vent 210, into clarifier 206 via pipe 212. Methanotrophs flocculate in large clumps at solid retention times greater than 4 days. Because of the "sticky" nature of the methanotrophs, the sludge blanket (not shown) maintained in clarifier 206 is gently agitated with mixing vane 214. Liquid effluent is pumped from the top of clarifier 206 by a pump (not shown) through line 216.

As illustrated in FIG. 2, solids are drawn from the bottom of clarifier 206 through line 220, and are pumped by pump 222 into reactor inlet line 240 through line 226 for recycle into reactor tank 202. Solids recycle may optionally be controlled by a timer (not shown) connected to pump 222.

The method of the invention is effective for removing the various forms of nitrogen and phosphorus found in wastewater, including organic and particulate nitrogen, nitrates, nitrites, and ammonia, and particulate and soluble forms of phosphorus, orthophosphorus and polyphosphates.

As described above, wastewater in varying stages of purity may be treated by the method of the invention. No pre-treatment of raw sewage is necessary prior to treatment in accordance with the method of the invention, however, it may be desirable in particular applications to filter raw sewage to remove large particles, for example, those having a particle size of greater than about 10 $\mu$, prior to nutrient removal in accordance with the invention. Furthermore, in cases where the nitrogen to phosphorus ratio in the water to be treated falls outside the desired range for the practice of the method of the invention, the concentrations of nitrogen and/or phosphorus may be adjusted to achieve the desired ratio by adding sources of soluble nitrogen and phosphorus, such as urea, ammonium salts, and common fertilizers.

Microbial organisms useful in the practice of the invention may be grown on a variety of carbon sources, which may be used either alone or in combination. Suitable carbon sources include methane, methanol, propane, butane and sugars having 6 carbons or fewer.

Methane has several characteristics which make it attractive as a carbon source for wastewater treatment systems. Methane is non-toxic and very inexpensive as natural gas. It has a low solubility which means that residual methane will not contribute significantly to effluent BOD.

As is described below, wastewater treatment in accordance with the method of the invention in suspended growth nutrient removal reactors, such as those depicted schematically in FIGS. 1 and 2, is carried out in a suspension of methanotrophs or aerobic heterotrophic bacteria in wastewater. In such a system, the microbes may be present in the suspension in amounts of from about 1 to about 10 g VSS/L, preferably about 3 to about 5 g VSS/L.

Microorganisms suitable for use in the method of the invention occur widely in nature and include those described, for example, in U.S. Pat. Nos. 5,057,221 to Bryant, et al., 4,877,736 to Flierman, and U.S. Pat. No. 4,954,258 to Little, which are hereby incorporated by reference.

Methane and oxygen may be fed to a nutrient removal reactor operated in accordance with the method of the invention either separately or together. Oxygen may be supplied as pure oxygen or as air. If methane and oxygen are fed together, gas supply must be adjusted to achieve concentrations in the mixture above or below explosive limits.

Operation of the nutrient removal systems illustrated in FIGS. 1 and 2 in accordance with the method of the invention is demonstrated by the following Examples. Experimental results are graphically shown in the FIGS. 3–8.

EXAMPLES

EXAMPLE 1

A laboratory-scale Methanotrophic Continuously Stirred Tank Reactor (MCSTR), as shown in FIG. 1, was constructed from a 7-liter fermentation unit (Model F-07, New Brunswick Scientific Co.) consisting of glass and stainless steel, with an N-butyl rubber seal between the fermentation vessel and the headplate. Reactor liquid was introduced continuously into the bottom of the cell recycle tube, which was a 1.25-L glass tube, and effluent was continuously pumped from the top of the tube to an effluent container. Solids recycle was accomplished by intermittently pumping settled solids from the bottom of the cell recycle tube back into the reactor. The gas supply system continuously recycled gas through the reactor liquid from a piston-type gas reservoir consisting of two polycarbonate cylinders which added an additional 9.5-L gas volume to the 3-L headspace in the reactor vessel. Gas was recycled from this reservoir to the bottom of the reactor liquid, where it was released directly beneath the lowest blade of three impellers mounted on a 0.95-cm shaft which was flex-coupled to a variable-speed ½ horsepower motor. Feed gases were supplied to the system either manually from high pressure cylinders, or metered from compressed gas tanks, kept at relatively low pressures and equipped with flash arrestors, via a mass flow controller (model FM4660, Union Carbide Industrial Gases, Inc.). Reactor tubing was Nalgene TM and pumps were peristaltic Masterflex pumps with Norprene TM membranes. The cell recycle pump was controlled by a Chrontrol TM timer (Lindburg Enterprises, Inc.). The entire apparatus was housed in a controlled environment room (Shirer-Gillet Co.) at 20° C.

Start-up of the laboratory-scale MCSTR was accomplished by inoculating 4 liters of secondary sewage effluent with a small amount of methanotrophic biomass obtained from an attached-film expanded-bed reactor, as described in Nelson, et al., Methanotrophic Bacteria for Nutrient Removal from Wastewater, *Water Environment Research*, vol. 64, no. 6 (September/October 1992), hereby incorporated by reference. The MCSTR was operated in batch mode for three days with nutrient additions to accumulate methanotrophic biomass.

Settled solids were intermittently recycled from the bottom of the cell recycle tube at a flow rate of 5 mL/min. Solids were also manually recycled and wasted from the cell recycle tube to maintain a steady mixed-liquor suspended solids concentration. Reactor headspace levels were approximately 40% $CH_4$, 40% $O_2$, 15% $CO_2$ and 5% $N_2$. $CO_2$ was purged twice daily from the reactor liquid and headspace by filling the gas reservoir with oxygen and allowing the recirculating oxygen to drive the $CO_2$ out of solution. The resultant headspace gas was then forced out of the gas reservoir cylinder, the purge repeated, and methane and oxygen added to bring the partial pressures back to desired values. The headspace gases were circulated through the reactor liquid at a rate of 4000 L/d.

Analytical procedures were conducted as follows: Ammonia concentrations were measured using the following colorimetric procedure. A 10 to 400 microliter filtered sample to be determined containing approximately 0.003 mg $NH_3$ was added to a clean acid-washed culture tube and 2.0 ml of a solution of 8.5% sodium salicylate and 0.03% sodium nitroferricyanide in water were added to the sample. To initiate the color change, 2.0 ml of a solution of 0.15% sodium dichloroisocyannurate and 4.8% sodium hydroxide was added. After one hour, 10 ml of distilled deionized water was added and absorbance at 660 nm read with a 2 or 4-cm flow cell on a Milton Roy Spectronic 1201 split-beam spectrophotometer.

Total Kjeldahl nitrogen was determined by method 4500-$N_{org}$ B. of *Standard Methods for the Examination of Water and Wastewater*, 17th Ed. (1989), hereby incorporated by reference.

Orthophosphate concentrations from filtered samples were measured with a Dionex Ion Chromatograph linked to a Spectra-Physics integrator, on an AS4A column with NG1-AG4A guard columns. The eluant was 1.8 mM $Na_2CO_3$ at a flow rate of 2.0 ml/min. The unit was calibrated with high and low standards immediately prior to analysis. Total phosphorus was determined using method 4500-PE. of *Standard Methods*, 17th Ed. (1989). Absorbance at 650 nm was read with a 2 or 4-cm flow cell on a Milton Roy Spectronic 1201 split-beam spectrophotometer.

Total suspended and volatile suspended solids were determined by methods 2540 D. and 2540 E., respectively, of *Standard Methods*, 17th Ed. (1989). Sludge volume index was determined by method 2710 D. of *Standard Methods*, 17th Ed. (1989). Chemical oxygen demand (COD) was determined by method 5220 D. ("Closed Reflux Colorimetric Method") of *Standard Methods*, 17th Ed. 1989. Biochemical oxygen demand ($BOD_5$) was measured by method 5210 B. of *Standard Methods*, 17th Ed. (1989).

Methane, oxygen, nitrogen, and carbon dioxide concentrations were measured with a Gow Mac Series 580 gas chromatograph equipped with a thermal conductivity detector. Methane and carbon dioxide were analyzed on a 1.7 m (0.6 cm ID) stainless-steel column packed with 60/80 mesh Propak Q (Supelco, Inc.), and nitrogen and oxygen were analyzed on a similar column packed with 60/80 mesh Molecular Sieve 5A (Supelco, Inc.). Operating temperatures were 55° C. for the columns, 110° C. for the detector, and 95° C. for the injection ports. The carrier gas was helium at a flow rate of 60 mL/min and output was analyzed with a Spectra-Physics SP 4270/4290 electronic integrator. pH was measured with a Corning 105 pH meter and a pencil combination electrode (Fisher Scientific Co., E-5M).

Methanotrophic cells were grown in suspension under the operating conditions described in Table 1, below. The reactor was first operated with a synthetic feed which was designed to mimic nutrient concentrations typically found in secondary sewage effluents. Nutrient removals during operation with this synthetic influent were poor relative to removals achieved with actual secondary sewage, as described below in Examples 2 and 3. Effluent ammonia concentrations ranged from 10 to 30 mg N/L, and effluent orthophosphate concentrations ranged from 0.6 to 3.1 mg P/L, as shown in Table 1. Gas use during this period was about half the gas use during operation with actual secondary sewage, even though dissolved methane concentrations averaged 2 mg/L and dissolved oxygen concentrations averaged 3 mg/L. This may have been partly due to the lower gas recycle rate, 300 L/L-d, which was used during operation with the synthetic feed, as described below.

EXAMPLES 2 AND 3

Secondary sewage was used as influent following the experiment with synthetic feed. Both copper-sufficient (Example 2) and copper-deficient (Example 3) conditions were employed, because copper is known to have a regulatory role in methanotrophic growth. When copper is available for cell uptake, methanotrophs express a particulate, membrane-associated form of the enzyme methane monooxygenase (pMMO), which catalyzes the oxidation of methane to methanol. When copper is not available for cell uptake, a soluble form (sMMO) of the enzyme is produced.

The yields of methanotrophs producing pMMO have been observed to increase 30–40% compared to methanotrophs producing sMMO, with as much as 70% of the substrate carbon (0.24 g cells/g COD) being incorporated into cell material. The increased yields appear to be due to different electron-donor couplings of the two forms of MMO. The sMMO-catalyzed oxidation of methane to methanol requires $NAD(P)H_2$ as an electron donor, whereas the pMMO-catalyzed oxidation can utilize electrons from donors other than $NAD(P)H_2$. Specifically, it is thought that methanol dehydrogenase can pass electrons directly to pMMO during the methanol dehydrogenase-catalyzed oxidation of methanol to formaldehyde. The methanol dehydrogenase-catalyzed reaction never produces $NADH_2$, and therefore this electron-coupling with the pMMO offers a significant energy advantage to the cell. It is this energy advantage that leads to the increased yield of methanotrophs grown in copper-sufficient media, and presumably, explains why the particulate form of MMO is made preferentially over the soluble form when sufficient copper is present.

Although pMMO results in higher methanotrophic cell yields, it is known that sMMO has a broader substrate range and often greater activity than the particulate form, and therefore is more useful for the degradation of refractory organics which may be present in sewage. For example, sMMO has been shown to catalyze the oxidation of trichloroethylene, naphthalene, phenol, and ethylbenzene at relatively high rates, while pMMO has been shown to catalyze those same reactions at slow rates or not at all.

Figure 3:
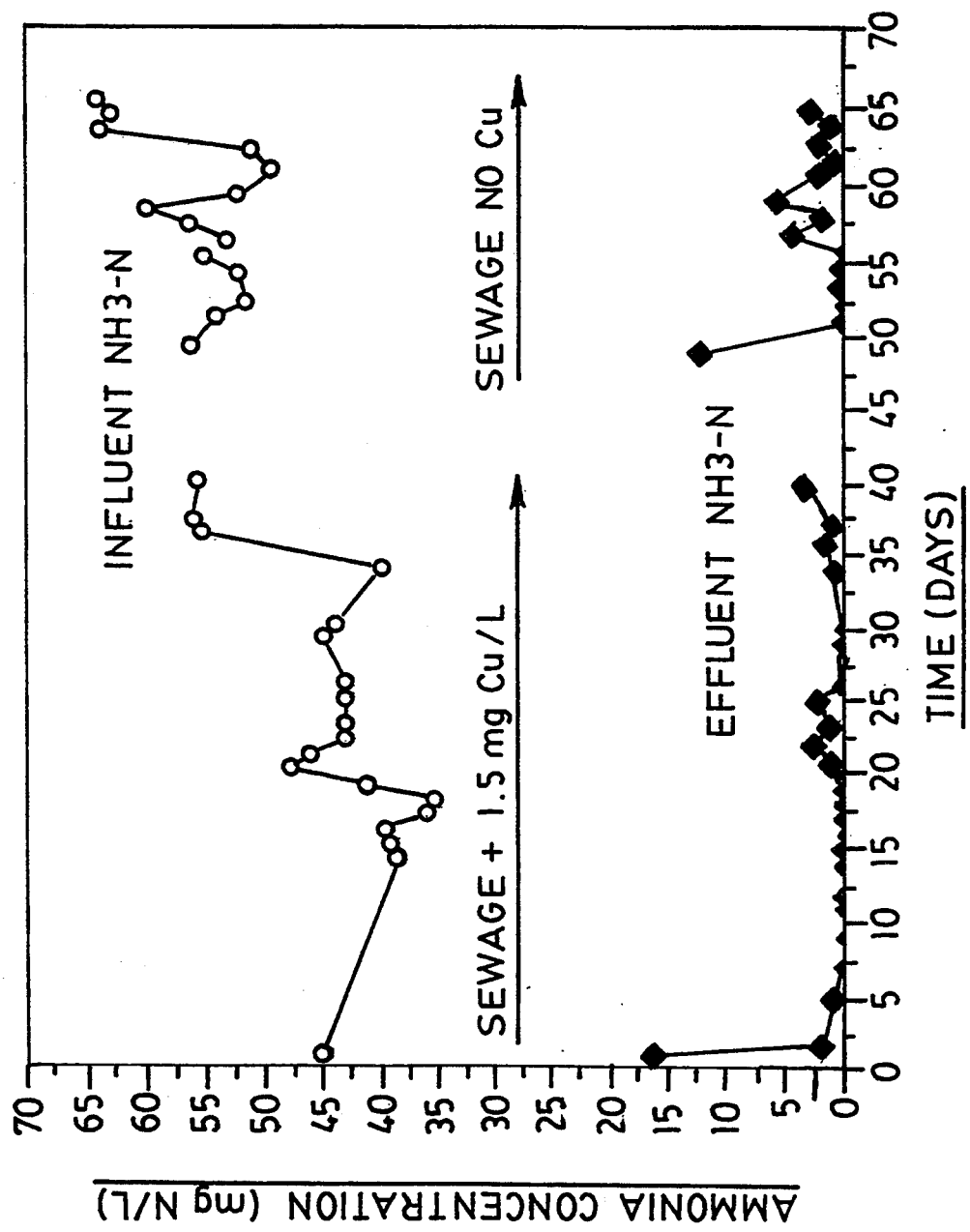
FIG. 3 is plot of ammonia concentration (mg N/L) versus time (days) during secondary sewage treatment in the reactor of FIG. 1.
Figure 4:
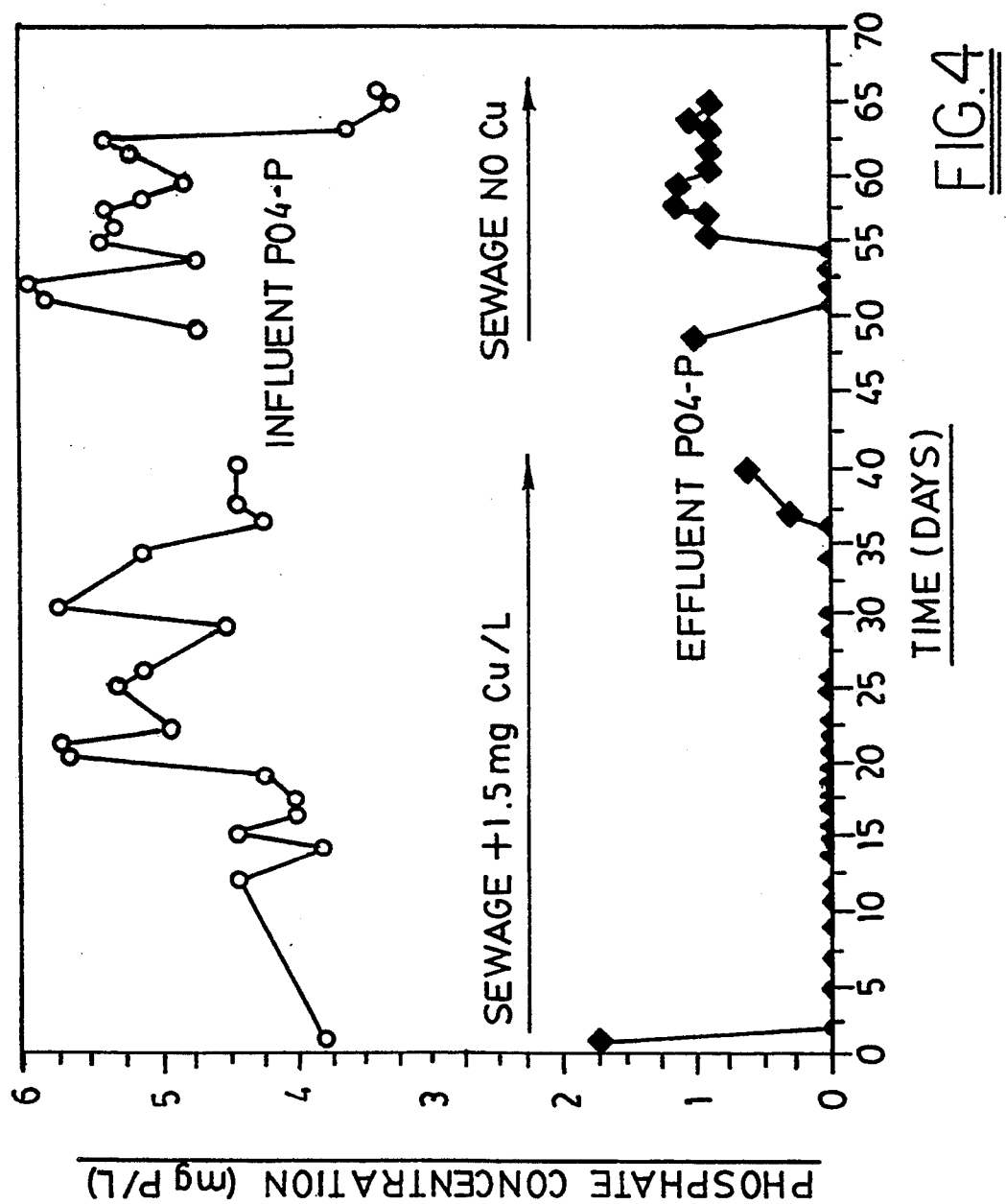
FIG. 4 is a plot of phosphate concentration (mg P/L) versus time (days) during secondary sewage treatment in the reactor of FIG. 1.
Figure 5:
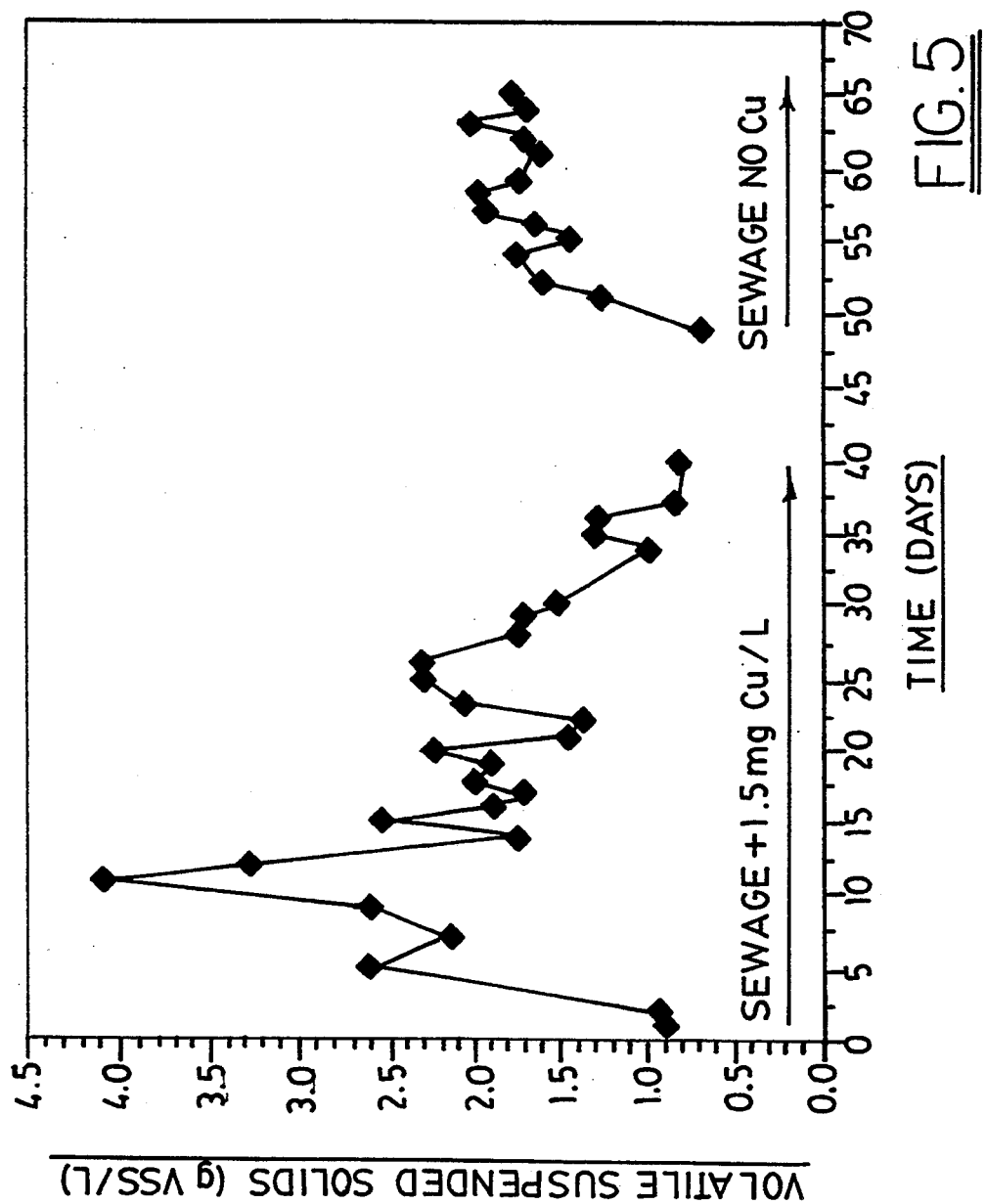
FIG. 5 is a plot of volatile suspended solids (g VSS/L) versus time (days) during secondary sewage treatment in the reactor of FIG. 1.

The copper concentration of the secondary sewage averaged 0.014 mg Cu/L, which was not high enough to select for the production of pMMO. Therefore, 1.5 mg of copper, as cupric chloride, was added to the reactor for every liter of secondary sewage effluent. The reactor was operated for 40 days under these conditions. Simultaneous nitrogen and phosphorus removal from secondary sewage was observed. Effluent ammonia concentrations were below 1 mg N/L on twelve of the nineteen days that nutrient measurements were taken, as shown in FIG. 3, and averaged 0.9 mg N/L over the course of the experiment. Effluent orthophosphate concentrations were below the detection limit of 0.1 mg P/L on every day but the last two days of operation, as shown in FIG. 4, during which time mixed-liquor suspended solids were allowed to drop as low as 800 mg VSS/L, as shown in FIG. 5. The soluble copper concentration in the effluent during this copper-sufficient condition averaged 0.127 mg Cu/L.

Following the experiment with copper amended sewage, the reactor was operated for twenty-one days with secondary sewage and no additional copper. Simultaneous nitrogen and phosphorus removal was again observed at efficiencies of 97% for ammonia and 85% for orthophosphate. Effluent ammonia concentrations ranged from below the detection limit of 0.05 mg N/L to 5.8 mg N/L, as shown in FIG. 3. Effluent orthophosphate concentrations ranged from below the detection limit of 0.1 mg P/L to 1.1 mg P/L, as shown in FIG. 4. Mixed-liquor suspended solids were between 1 and 2 g VSS/L, as shown in FIG. 5.

The methane requirement for nitrogen uptake (mg N/g COD), as shown in Table 1, was lowest for the copper-sufficient sewage. This condition also had the lowest effluent ammonia concentrations, which indicates that methanotrophs continue to take up methane when nutrient-limited. During conditions of excess carbon availability, methanotrophs will produce storage materials composed of fats and/or carbohydrates. As shown in Table 1, the percentage of nitrogen in the methanotrophic sludge was almost half for the copper-sufficient condition compared to the copper-deficient condition.

The copper-sufficient yield value of 0.16 g VS/g COD (0.64 g VS/g $CH_4$) indicates that approximately half of the carbon from methane was incorporated into biomass while the reactor was operating with that influent. Yields during copper-deficient operation were about 30% lower compared to copper-sufficient operation. As previously discussed, these yield differences are thought to be the result of different electron-transfer capabilities of sMMO and pMMO. The fact that such significant yield differences were observed demonstrates that methanotrophs were expressing different forms of methane monooxygenase at the different copper concentrations.

The large majority of methane-derived carbon which did not become incorporated into biomass was oxidized to carbon dioxide. The MCSTR utilized a closed gas headspace with gas recycle. Since copper-deficient yields were lower, the partial pressure of $CO_2$ in the headspace was higher than in copper-sufficient conditions. This resulted in lower mixed-liquid pH during copper-deficient operation, as shown in Table 1. High rates of methane and oxygen use, and nitrogen and phosphorus uptake continued at the low pH values.

Mixed-liquor suspended solids were consistently between 1.5 and 2.0 g VSS/L, as shown in FIG. 5. Higher concentrations were possible, but were avoided due to limitations in gas transfer capability. Periodic wasting of solids from the reactor and the cell recycle tube was necessary to maintain the concentration in the desired range, with more frequent solids wasting taking place during the high-yield, copper-sufficient experiment. The solids present in the reactor typically had a distinctive salmon color, although at lower pH the biomass took on a white color. The filtrate obtained from filtering reactor liquid through glass fiber filters contained a large amount of bacteria. Examined microscopically, the predominant organism in this filtrate was a cocci approximately 1 μm. The relative abundance of this organism increased when the reactor was operating at lower pH values. Due to the fact that this organism passed through glass fiber filters, the reactor effluent frequently had a higher COD than the influent did, and COD values were as high as 120 mg COD/L. This COD was presumably exerted by the small bacteria which passed through the glass filters and not by soluble organic matter.

The laboratory-scale MCSTR was able to simultaneously remove both ammonia nitrogen and orthophosphate from secondary sewage. These removals were accomplished under conditions of both copper-sufficiency and copper-deficiency. Phosphorus concentrations were reduced from influent concentrations of 5 mg/L to below 0.1 mg/L and ammonia nitrogen concentrations were reduced from influent concentrations of 50 mg/L to below 0.05 mg/L. The reactor was able to operate for periods of several weeks at low nutrient concentrations with no noticeable difficulties. In addition, it was demonstrated that the methanotrophic cultures could be made to induce either soluble or particulate methane monoxygenase in response to the copper concentrations of the influent.

The laboratory-scale reactor used an average of 2 g $CH_4$/L-d and 6 g $O_2$/L-d when operated with secondary sewage. On a volume basis, this is equivalent to 2.8 L $Ch_4$L-d and 4.3 L $O_2$/L-d. Thus the 4-liter reactor was typically using a total of 28 L gas/d. The oxygen requirements for methanotrophic tertiary treatment are high enough that BOD removal might be best accomplished simultaneously with nutrient removal. Soluble $BOD_5$ was measured three times during pilot-scale treatment at a 9-hour HRT. All three measurements were below 10 mg/L and soluble COD decreased from over 110 mg/L at the start of this condition, to 36 mg/L at the end. The secondary sewage used in laboratory-scale testing was very low in organics and the high rate of methane use and pink sludge indicated that methanotrophic growth dominated this system.

It was also demonstrated that the production of either sMMO or pMMO could be determined by the copper concentrations of the influent. This may be of importance for tertiary treatment of sewage known to contain halogenated organics, since the different enzymes have been shown to have different substrate ranges and activities. For example, sMMO has been shown to catalyze the oxidation of trichloroethylene, naphthalene, phenol, and ethylbenzene at relatively high rates, while pMMO has been shown to catalyze those same reactions at slow rates or not at all. Methanotrophic systems which are capable of simultaneously removing nutrients and refractory organics should be useful for industrial waste treatment as well as municipal wastewater treatment.

TABLE 1

Summary of conditions and results during secondary sewage treatment in the laboratory-scale MCSTR.

| | Example 1 | Example 2 | Example 3 |
|---|---|---|---|
| Influent Source | Artificial Sewage no Cu | Secondary Sewage + 1.5 mg Cu/L (copper-sufficient) | Secondary Sewage no Cu (copper-deficient) |
| Operating Conditions: | | | |
| Temperature (°C.) | 20 | 20 | 20 |
| Liquid volume (L) | 6.5 | 4.0 | 4.0 |
| Flow rate (L/d) | 13 | 8 | 8 |
| HRT (hours) | 12 | 12 | 12 |
| Gas recycle rate (L/L-d) | 300 | 1000 | 1000 |
| Average pH | 4.6 | 5.6 | 4.7 |
| Copper added (mg/Cu/L) | 0 | 1.5 | 0 |
| Influent copper (mg Cu/L) | nm | 1.5 | 0.02 |
| Yeast extract (mg/L) | 1 | 0 | 0 |
| Growth Characteristics: | | | |
| Mixed-liquor solids (g VSS/L) | 2.05 | 1.66 | 1.71 |
| Specific growth rate (day$^{-1}$) | nm | 0.81 | 0.56 |
| Observed yield (g VS/g COD) | nm | 0.16 | 0.12 |
| % N of solids | nm | 6.6 | 12 |
| % P of solids | nm | 0.73 | 0.73 |
| Nutrient Assimilation: | | | |
| Ammonia | | | |
| Influent (mg N/L) | 44 | 44 | 56 |
| Effluent (mg N/L) | 19 | 0.9 | 1.6 |
| Removal efficiency (%) | 57 | 98 | 97 |
| Uptake rate (mg N/g VS-d) | 28 | 51 | 62 |
| Uptake rate (mg/N/L-d) | 58 | 85 | 106 |
| Phosphate: | | | |
| Influent (mg P/L) | 4.9 | 4.7 | 4.8 |
| Effluent (mg P/L) | 1.5 | <0.1 | 0.6 |
| Removal efficiency (%) | 69 | 100 | 88 |
| Uptake rate (mg P/g VS-d) | 3.9 | 6.0 | 5.5 |
| Uptake rate (mg P/L-d) | 7.9 | 9.9 | 9.4 |
| N/P Uptake Ratio (g N/g P) | 7.0 | 8.6 | 11 |
| Gas Use: | | | |
| Methane (g $CH_4$/L-d) | 0.9 | 2.1 | 2.0 |
| Oxygen (g $O_2$/L-d) | 2.7 | 6.1 | 6.4 |
| Gas use ratio (g $O_2$/g $CH_4$) | 3.0 | 2.9 | 3.2 |
| $CH_4$ req'd (mg N/g COD) | 15 | 11 | 14 |
| $CH_4$ req'd (mg P/g COD) | 2.1 | 1.2 | 1.2 | nm = not measured

EXAMPLE 4

A pilot-scale MCSTR, such as that illustrated in FIG. 2, was constructed using a 1900-liter fiberglass tank with an airtight plexiglass cover. The reactor was operated at a liquid volume of 1000 liters. Gases were recycled from the reactor headspace, mixed with feed gases (air and methane) in the aspirator tube and rapidly introduced to the reactor liquid with a 2-hp submerged turbine aerator (Franco model 075T-20RP). Raw sewage flowed continuously from the headworks of the Ithaca Wastewater Treatment Plant into a 55-gallon barrel used to remove grit and large particles. Influent was pumped into a progressing cavity pump (Moyno Products) driven by a ¼-hp variable-speed motor (U.S. Motors), from an overflow port on the barrel to the reactor.

Methane was supplied to the reactor via two-356 ft$^3$ cylinders of commercial grade methane (Matheson, 93% purity), equipped with two-stage regulators (Fisher Scientific Co.) and flash arrestors. Methane flow was controlled with a calibrated gas rotameter (Brooks E/C, 0–3 scfh) and measured with a Precision wet test gas meter (GCA Corp., model 63126) equipped with a digital counter. Air was supplied to the reactor by an ⅛-hp oil-less diaphragm air compressor (Dayton). Air flow was controlled with a calibrated gas rotameter (Dwyer RMB series, 0–50 scfh) and measured with a wet test gas meter. Methane and air were supplied in separate gas lines and introduced to the reactor in the 2-inch PVC aspirator tube, which functioned as both the gas supply line and gas recycle line. Exhaust gas exited through a 2-inch PVC pipe in the top of the reactor into a water-filled reservoir to prevent the backflow of atmospheric gas, and was measured with a wet test gas meter before being vented outside. Gas samples were drawn from the exhaust line through a Swagelock ™ tee and Teflon ™ lined septa.

Effluent exited the reactor through a vertical 4-inch PVC internal settling column into a 50-liter polyethylene clarifier, which was operated to retain effluent solids for recycle. Effluent entered the cone of the clarifier through a centered 2-inch PVC pipe. A sludge blanket of approximately 10 liters was maintained in the cone. The sludge blanket was gently agitated with a mixing vane driven by a 4 rpm shaded pole gearmotor (Dayton). Solids were drawn from the bottom of the cone with a peristaltic pump (Cole Parmer, 6–600 rpm, 7018 head) and recycled back to the reactor either continuously or intermittently (via a Dayton timer).

As described below, the reactor was operated under 9 hour, 18 hour and 40 hour conditions. For the 9-hour condition, the 50-liter clarifier was replaced with a 70-gallon barrel which provided a longer retention time for this high flow rate test.

Recycle was pumped from the bottom of the barrel with a submersible pump (Little Giant) controlled by a timer (Dayton). Effluent from the clarifier(s) was pumped to a 4300-liter holding tank via an intermediate collection barrel and submersible pump (Little Giant). The contents of the holding tank were mixed, sampled and discharged on a daily basis.

The entire pilot system was located in an unheated section of a greenhouse adjacent to the Ithaca Wastewater Treatment Plant. This experiment took place in the winter months with ambient temperatures typically between 4° C. and 15° C., and sewage temperatures between 8° C. and 14°. The reactor temperature, as shown in Table 2, was generally consistent within 2° C. during each condition due to the heat generated by the turbine aerator.

Start-up of the pilot-scale MCSTR was accomplished by supplying methane and air to 1000-liters of unseeded raw sewage from the Ithaca Wastewater Treatment Plant. The reactor was operated for one month at a hydraulic retention time (HRT) of 4 to 5 days. Methane was supplied at the rate needed to assimilate all the available nitrogen, as theoretically calculated, assuming a 30% transfer efficiency. Air was supplied to provide oxygen at 1.6 times the rate of methane (v/v). Headspace levels were approximately 10% $O_2$, 3% $CH_4$ and 2% $CO_2$. $CO_2$ purging was not needed with this system due to the high volume of air supplied to the system to achieve the desired oxygen level. Methane levels were also lower because the reactor headspace was 900 liters and methane was supplied via tanks.

Effluent from the clarifier was pumped to a holding tank to obtain a representative composite sample. On a daily basis the contents of the effluent holding tank were completely mixed with a centrifugal pump (Teel), sampled and discharged back to the headworks of the Ithaca Wastewater Treatment Plant. Effluent was collected and analyzed to determine the solids wasted from the system. Composite samples were drawn from the influent line using a Masterflex peristaltic pump and stored in a cooler. Mixed liquor was sampled directly from the reactor via a 1-inch PVC pipe, as shown in FIG. 2.

Following a one month start-up period, the pilot-scale MCSTR was operated continuously with raw sewage for 54 days under the three conditions described in Table 2, below.

Figure 6:
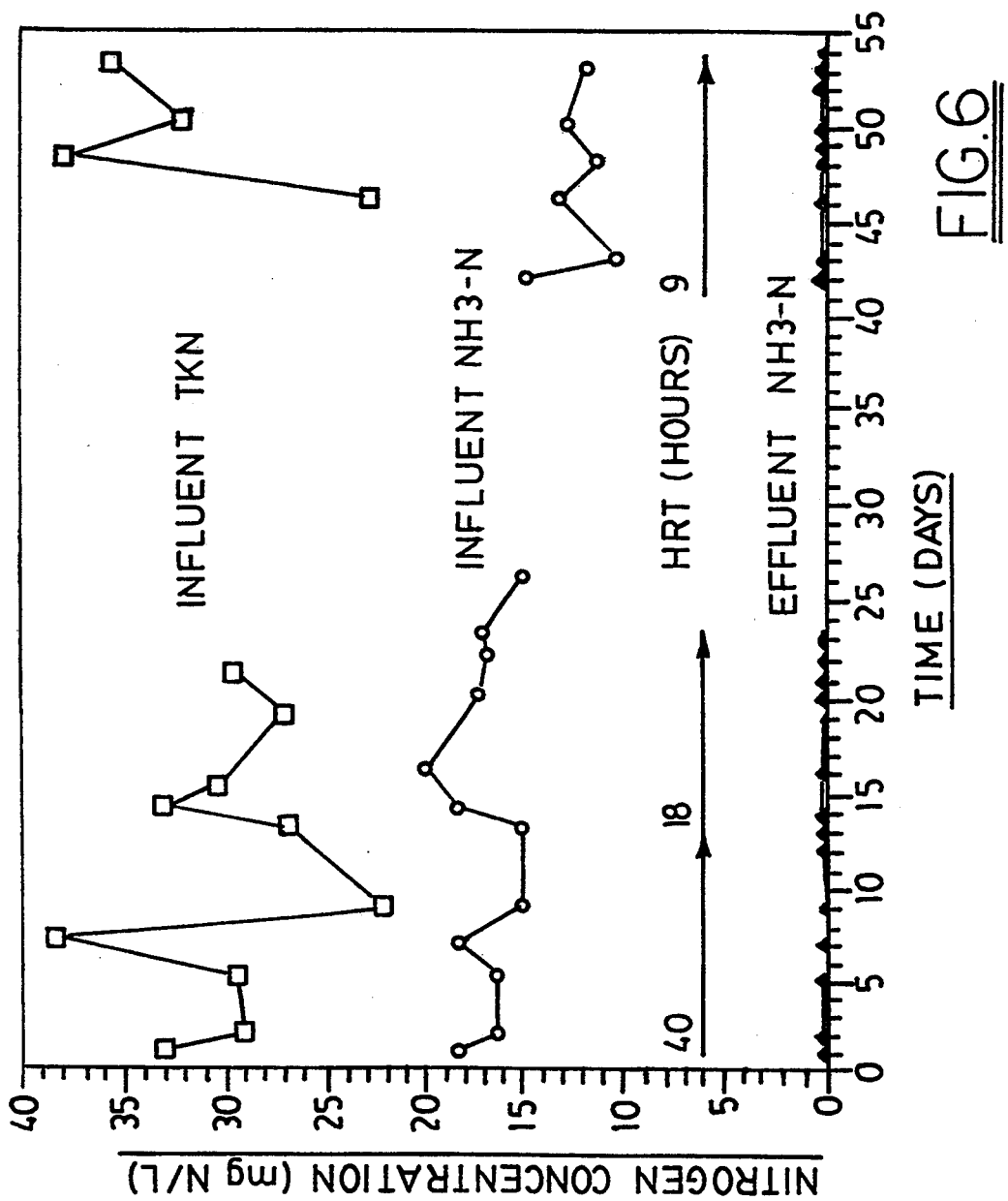
FIG. 6 is a plot of nitrogen concentration (mg N/L) versus time (days) during raw sewage treatment in the reactor of FIG. 2.
Figure 7:
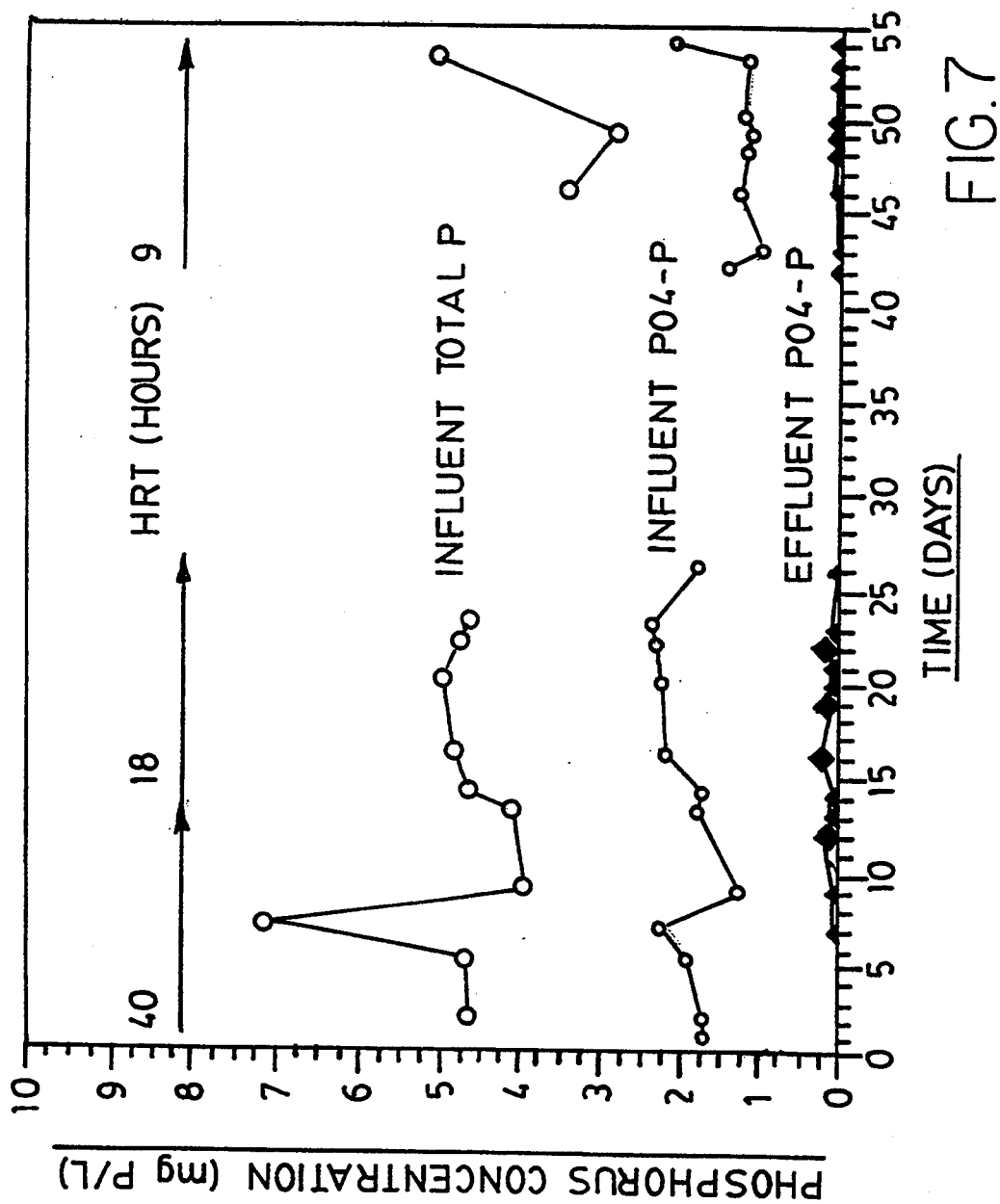
FIG. 7 is a plot of phosphorus concentration (mg P/L) versus time (days) during raw sewage treatment in the reactor of FIG. 2.
Figure 8:
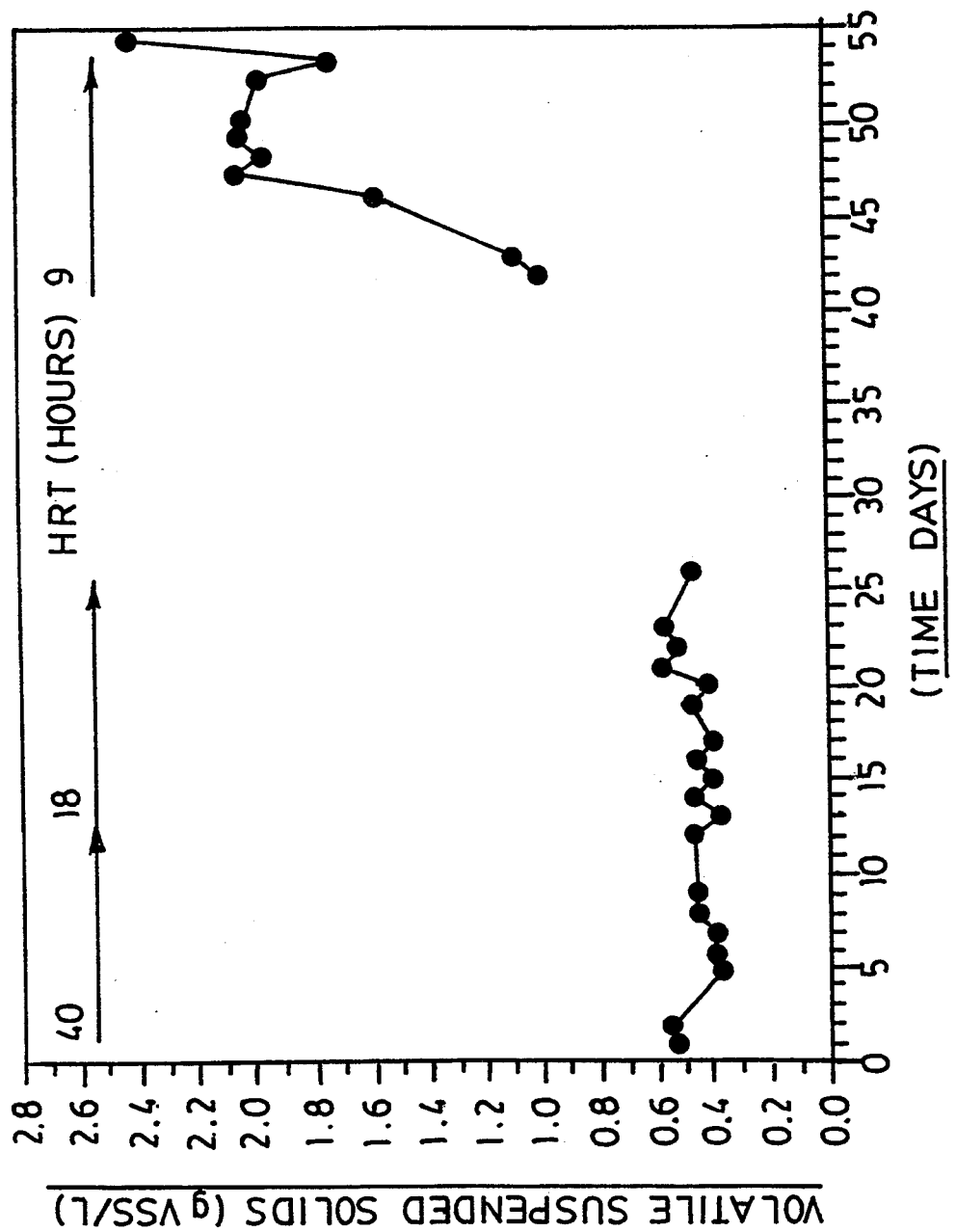
FIG. 8 is a plot of volatile suspended solids (g VSS/L) versus time (days) during raw sewage treatment in the reactor of FIG. 2.

The analytical procedures used to evaluate the method of the invention in the pilot-scale embodiment were the same as those described above in Example 1. Simultaneous removal of nitrogen and phosphorus was observed at all three conditions at effluent concentrations for ammonia below 0.25 mg N/L, as shown in FIG. 6 and for orthophosphate below 0.10 mg PL, as shown in FIG. 7. Conservative estimates of nutrient uptake rates were calculated based on the influent and effluent concentrations of ammonia and orthophosphate, as shown in Table 2, because the fate of the organic forms of these nutrients were not known. Removal efficiencies were very high, averaging 99% for ammonia and between 95% and 97% for phosphate, indicating that higher removal rates could be achieved at higher nutrient loadings. Maximum rates observed in the laboratory-scale MCSTR were over 100 mg N/L-d and near 10 mg P/L-d, as shown in Table 1.

A nitrogen balance was calculated based on the TKN of the raw sewage and the TKN of the effluent and wasted solids leaving the system. These two measurements should be equal when the growth rate is balanced by the solids wasting rate. This is achieved when steady mixed-liquor suspended solids concentrations are observed. As shown in Table 2, a good TKN balance was observed during the 40 and 18-hour conditions. A TKN balance less than 50% during the 9-hour condition was due to a continuous accumulation of solids in the clarifier which were not measured.

The gas use ratios and methane requirements, as shown in Table 2, were similar to the results obtained from laboratory-scale testing, reported in Table 1. Gas use on a per volume basis was much lower in the pilot-scale system because influent nutrient concentrations were much lower. Oxygen use could not be determined during the 9-hour condition due to mechanical problems.

Methanotrophic growth rates and yields were not calculated for the pilot-scale system for several reasons. The raw sewage contained suspended solids concentrations between 100 and 200 mg TSS/L. The fraction of these solids not degraded in the reactor was not known, but clearly influent solids affected mixed-liquor suspended solids measurements. Another factor was the presence of aerobic organisms other than methanotrophs. The biomass had the same color and characteristics observed in the laboratory-scale MCSTR, but a darker activated sludge which settled better was also present. As shown in Table 2, the low effluent COD and BOD measurements indicated that other heterotrophic organisms were present in substantial numbers. Therefore mixed-liquor volatile solids were a measurement of more than methanotrophs.

Sludge volume index (SVI) was measured on a regular basis. As shown in Table 2, SVI measurements increased significantly at higher solids concentrations. Visually, it appeared that settling improved when suspended solids exceeded 1 g VSS/L. A distinct sludge layer was a clear supernatant formed during SVI measurements at the higher solids concentrations. This sludge layer reached a maximum depth after about 20 minutes of settling and then slowly compressed. Settling tests were carried out for 60 minutes during the 9-hour condition and total suspended solids (TSS) in the supernatant above the settled sludge were measured to determine the solids content of the settled sludge. The TSS concentration of the settled sludge was between 2.2 and 2.6 times higher than the completely-mixed sample, resulting in a settled sludge with 0.5% total solids.

TABLE 2

Summary of conditions and results during raw sewage treatment in the pilot-scale MCSTR.

| Hydraulic Retention Time (hours) | 40 | 18 | 9 |
|---|---|---|---|
| Operating Conditions: | | | |
| Temperature (°C.) | 21 | 17 | 16 |
| Liquid volume (L) | 1000 | 1000 | 1000 |
| Flow rate (L/min.) | 0.42 | 0.93 | 1.9 |
| Average pH | 6.4 | 6.3 | 6.4 |
| Influent solids (mg TSS/L) | 129 | 140 | 179 |
| Solids Characteristics: | | | |
| Mixed-liquor solids (g VSS/L) | 0.406 | 0.495 | 2.00 |
| Sludge volume index | 25 | 50 | 217 |
| Solids wasting rate (g VSS/d) | 182 | 342 | nm$^2$ |
| Solids retention time (hours) | 48 | 30 | nm$^2$ |
| Nutrient Assimilation (assuming only update of soluble nutrients): | | | |
| Ammonia: | | | |
| Influent (mg N/L) | 17 | 17 | 12 |
| Effluent (mg N/L) | 0.12 | 0.12 | 0.17 |
| Removal efficiency (%) | 99 | 99 | 99 |
| Uptake rate[1] (mg N/L-d) | 9.4 | 21 | 30 |
| Phosphate: | | | |
| Influent (mg P/L) | 1.8 | 2.1 | 1.3 |
| Effluent (mg P.L) | 0.09 | 0.08 | 0.04 |
| Removal efficiency (%) | 95 | 96 | 97 |
| Uptake rate[1] (mg P/L-d) | 0.94 | 2.6 | 3.1 |
| N/P Uptake Ratio (g N/g P) 9.7 | 9.7 | 9.0 | 7.8 |
| Nitrogen Mass Balance: | | | |
| TKN of raw sewage (g N/d) | 18.0 | 40.8 | 87.8 |
| TKN wasted (g N/d) | 14.6 | 38.6 | 39.4$^2$ |
| Mass balance (g N out/g N in) | 81 | 94 | 45 |
| Gas Use: | | | |
| Methane (g CH$_4$/L-d) | 0.31 | 0.43 | 0.69 |
| Oxygen (g O$_2$/L-d) | 1.0 | 1.6 | nm |
| Gas use ratio (g O$_2$/g CH$_4$) | 3.2 | 3.8 | nm |
| CH$_4$ req'd (mg N/g COD) | 7.7 | 13 | 12 |
| CH$_4$ req'd (mg P/g COD) | 0.84 | 1.5 | 1.2 |
| Oxygen Demand: | | | |
| COD: | | | |
| Influent total (mg/L) | 237 | 239 | 272 |
| Effluent soluble (mg/L) | nm | 63 | 36 |
| BOD: | | | |
| Influent total (mg/L) | nm | 168 | 144 |
| Effluent soluble (mg/L) | nm | nm | 8.7 | nm = not measured
[1]Nutrient uptake rates do not reflect the conversion of organic forms to soluble forms, and are therefore conservative estimates.
[2]Solids accumulation in the clarifier was not measured.

The results of solids analysis from mixed-liquor in the pilot-scale system are shown in Table 3. The heavy metal concentrations shown in Table 3 are on the low end of ranges for wastewater sludge.

TABLE 3

Results of solids analysis during treatment of raw sewage at a 9 hour HRT in the pilot-scale MSCTR.

| Element | | Element | | Amino Acid | |
|---|---|---|---|---|---|
| N | 6.04% | Mn | 78.05 ppm | Gly | 22202 mg/kg |
| P | 1.16% | Mo | 5.226 ppm | His | 7218 mg/kg |
| Ca | 1.37% | Na | 11620 ppm | Ile | 16882 mg/kg |
| K | 0.45% | Ni | 26.06 ppm | Leu | 27519 mg/kg |
| Mg | 0.32% | Pb | 17.51 ppm | Lys | 19367 mg/kg |
| S | 0.21% | V | 4.320 ppm | Met | 8084 mg/kg |
| Al | 1243 ppm | Zn | 173.1 ppm | Phe | 18629 mg/kg |
| B | 10.64 ppm | Amino Acid | | Pro | 14810 mg/kg |
| Cd | 1.898 ppm | Ala | 27330 mg/kg | Ser | 15233 mg/kg |
| Co | 5.433 ppm | Arg | 17424 mg/kg | Thr | 18927 mg/kg |
| Cr | 156.4 ppm | Asx | 37255 mg/kg | Tyr | 14841 mg/kg |
| Cu | 201.9 ppm | Cys | 862 mg/kg | Val | 23116 mg/kg |
| Fe | 6687 ppm | Glx | 42619 mg/kg | | |
| Cd/Zn | 0.011 | | | | |
| Protein | 33.2% | | | | |
| N/P ratio | 5.21 | | | | |

The pilot-scale MCSTR also removed both nutrients simultaneously, resulting in effluent concentrations below 0.25 mg N/L for ammonia and 0.10 mg P/L for phosphate. Highly efficient nutrient uptake was observed at HRT's of 40, 18 and 9 hours. Mixed-liquor suspended solids were mostly under 0.5 g VSS/L during the 40 and 18-hour conditions, but increased to 2 g VSS/L during the 9-hour condition. This was accomplished with a higher solids recycle rate and improved clarification. Sludge settled to a total solids content of 0.5% after 60 minutes in an Imhoff cone.

Solids from the pilot system had some characteristics of activated sludge (i.e., color, order) not present in the laboratory-scale system. These characteristics indicated that other aerobic heterotrophic bacteria were present, and degrading substrates other than methane resulting in low effluent BOD/COD. As shown in Table 2, influent concentrations in the raw sewage were approximately 240 mg COD/L and 150 mg BODs/L.

The method of the invention has been described with reference to the suspended solids reactors shown in FIGS. 1 and 2. The present invention is by no means limited to such an embodiment. An alternative system useful in carrying out the method Of the invention is the attached film expanded bed system shown and described in Nelson, et al. Methanotrophic Bacteria for Nutrient Removal from Wastewater: Attached Film System Water Environment Research, vol. 64, no. 6 (September/October 1991), previously incorporated herein by reference. In an attached film system operated in accordance with the invention, wastewater is contacted with the microbial organisms by passing the wastewater through a bed on which the organisms are supported in an attached film, in an amount of from about 20 to about 40 g VSS/L of static bed, preferably from about 25 to about 35 g VSS/L of static bed.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A method for the biological treatment of water containing nitrogen and phosphorus, comprising:
   providing water containing nitrogen and phosphorus, wherein said water has not been subjected to biological or chemical water treatment; and
   contacting said water with at least one substituted or unsubstituted hydrocarbon compound having from 1 to 6 carbon atoms in the presence of one or more species of microbial organisms selected from the group consisting of aerobic methanotrophs and aerobic heterotrophic bacteria under conditions effective to reduce soluble nitrogen levels in said water to below about 1 mg/L and soluble phosphorus levels to below about 1 mg/L.

2. A method according to claim 1, wherein said nitrogen and said phosphorus are present in said water prior to said contacting in a nitrogen to phosphorus ratio of from about 15:1 to about 4:1 by mass of nitrogen and phosphorus.

3. A method according to claim 2, wherein said nitrogen to phosphorus ratio is from about 12:1 to about 8:1.

4. A method according to claim 1, wherein said nitrogen is present in said water prior to said contacting in the form of organic nitrogen, particulate nitrogen, nitrates, nitrites or ammonia.

5. A method according to claim 1, wherein said phosphorus is present in said water prior to said contacting in the form of particulate phosphorus, soluble phosphorus, orthophosphorus, or polyphosphates.

6. A method according to claim 1, wherein said water comprises effluent wastewater from a sewage collection system.

7. A method according to claim 6, wherein said wastewater has not been pre-treated.

8. A method according to claim 1, further comprising:
   filtering solid particles having a particle size greater than about 10 μ from said water prior to said contacting.

9. A method according to claim 1 wherein said contacting is carried out in the presence of copper.

10. A method according to claim 9, wherein said copper is added to said water as cupric chloride.

11. A method according to claim 1, wherein said water has a temperature of from about 1° C. to about 43° C. during said contacting.

12. A method according to claim 11, wherein said water has a temperature of from about 20° C. to about 39° C. during said contacting.

13. A method according to claim 1 wherein said hydrocarbon compound is selected from the group consisting of methane, methanol, propane, butane and sugars.

14. A method according to claim 13, wherein said hydrocarbon compound is methane.

15. A method according to claim 1, further comprising:
   producing nutritionally useful sludge.

16. A method according to claim 1, wherein said contacting is carried out in a suspension of said organisms in said water in an amount of from about 1 to about 10 g VSS/L.

17. A method according to claim 16, wherein said organisms are suspended in said water in an amount of from about 3 to about 5 g VSS/L.

18. A method according to claim 1, wherein said contacting is carried out by passing said water through a bed on which said organisms are supported in an attached film in an amount of from about 20 to about 40 g VSS/L of static bed.

19. A method according to claim 18, wherein said organisms are supported on said bed in an amount of from about 25 to about 35 g VSS/L of static bed.

20. A method according to claim 1, wherein said nitrogen and phosphorus levels are each reduced to below about 0.1 mg/L.

21. A method for reducing nitrogen and phosphorus levels in wastewater, comprising:
   providing wastewater containing nitrogen and phosphorus, wherein said wastewater has not been subjected to biological or chemical water treatment;
   filtering solid particles having a particle size greater than about 10 μ from said wastewater
   contacting said treated wastewater with methane in the presence of aerobic methanotrophs, wherein said contacting is carried out in a suspension of said methanotrophs in said treated wastewater in an amount of from about 3 to about 5 g VSS/L under conditions effective to reduce soluble nitrogen and soluble phosphorus levels in said treated wastewater each to below about 0.1 mg/L; and
   producing nutritionally useful sludge.

* * * * *